June 24, 1958 W. R. POLANIN ET AL 2,840,190
RAILWAY BRAKE
Filed June 30, 1955 2 Sheets-Sheet 1

Witness:
Charles Bassett

INVENTORS.
Walter R. Polanin
John A. Buvelot
By Walter L. Schlegel, Jr. Atty.

June 24, 1958  W. R. POLANIN ET AL  2,840,190
RAILWAY BRAKE
Filed June 30, 1955  2 Sheets-Sheet 2
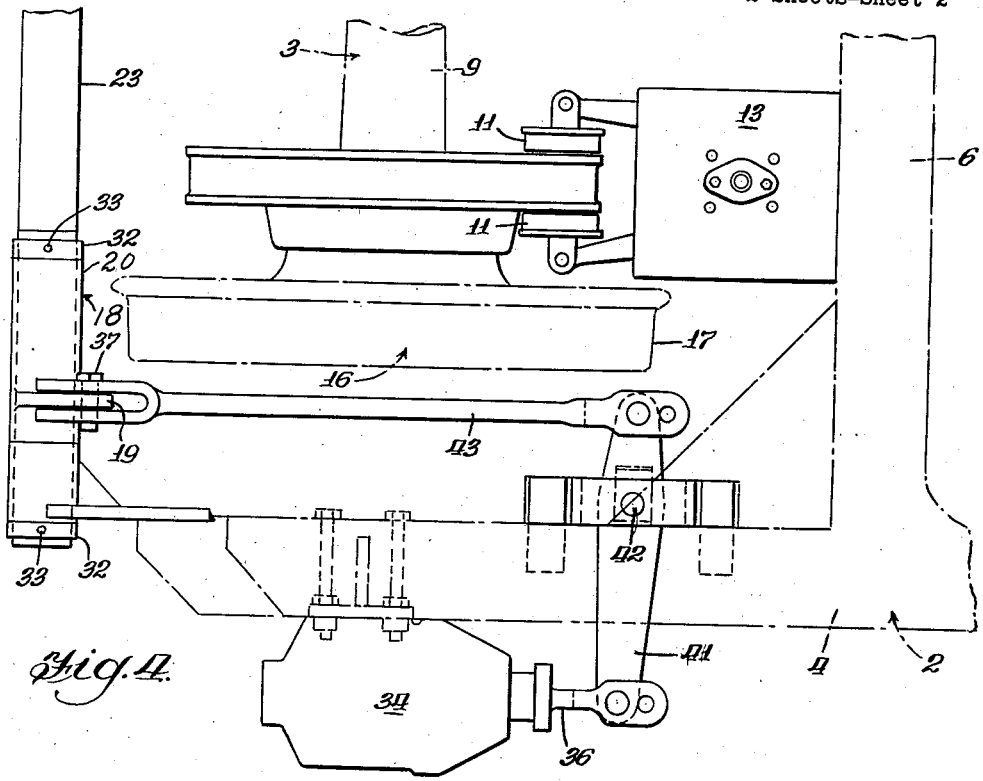
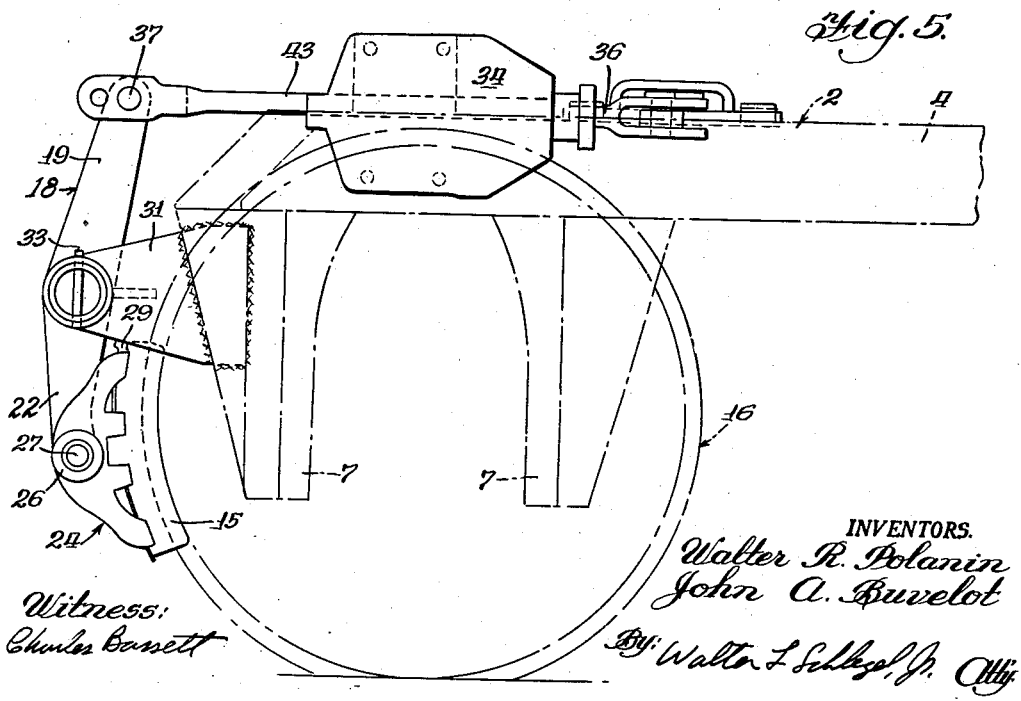
INVENTORS.
Walter R. Polanin
John A. Buvelot
By Walter L. Schlegel, Jr. Atty.
Witness:
Charles Bassett United States Patent Office 2,840,190
Patented June 24, 1958

2,840,190

RAILWAY BRAKE

Walter R. Polanin and John A. Buvelot, Chicago, Ill., assignors to American Steel Foundries, Chicago, Ill., a corporation of New Jersey Application June 30, 1955, Serial No. 519,178

3 Claims. (Cl. 188—33)

This invention relates to railway car trucks and more particularly to a tread brake arrangement adapted for use on railway car trucks provided with off-wheel brake arrangements.

During use of railway car trucks provided with off-wheel brake equipment, the treads of the wheels become coated with foreign material which decreases the coefficient of friction between the wheel and a rail. The wheel treads also reach a state or condition which materially reduces the strength of electrical signals passing thereto from the rails. It is, therefore, an object of the invention to provide such trucks with a tread brake arrangement adapted to coact with the off-wheel brake equipment to decelerate a railway car, the tread brake arrangement comprising a single shoe frictionally engageable with the tread of its respective wheel to maintain the wheel tread in proper operating condition.

Another object of the invention resides in the provision of a tread brake arrangement in which each wheel may be provided with a brake structure operable independently of other brake structures to decelerate a train and also condition the tread of its respective wheel.

A further object of the invention resides in the provision of a tread brake unit adapted to occupy a minimum space and to meet the various requirements for successful operation and service.

Another object of the invention contemplates the provision of a pair of brake levers journaled on opposite ends of a sleeve which extends transversely of a truck frame adjacent one end thereof, the sleeve being supported at its ends on brackets secured to the side rails of the frame.

Another object is to provide a tread brake arrangement in which each brake lever is connected either directly or indirectly to the piston of an operating cylinder mounted on a side rail of the truck frame.

The invention embodies other novel features, details of construction and arrangement of parts which are hereinafter set forth in the specification and claims and illustrated in the accompanying drawings, wherein:

Figure 4 is a fragmentary top plan view illustrating a modified form of the invention;

Figure 5 is a side elevational view of same.

Figures 1, 2, 3:
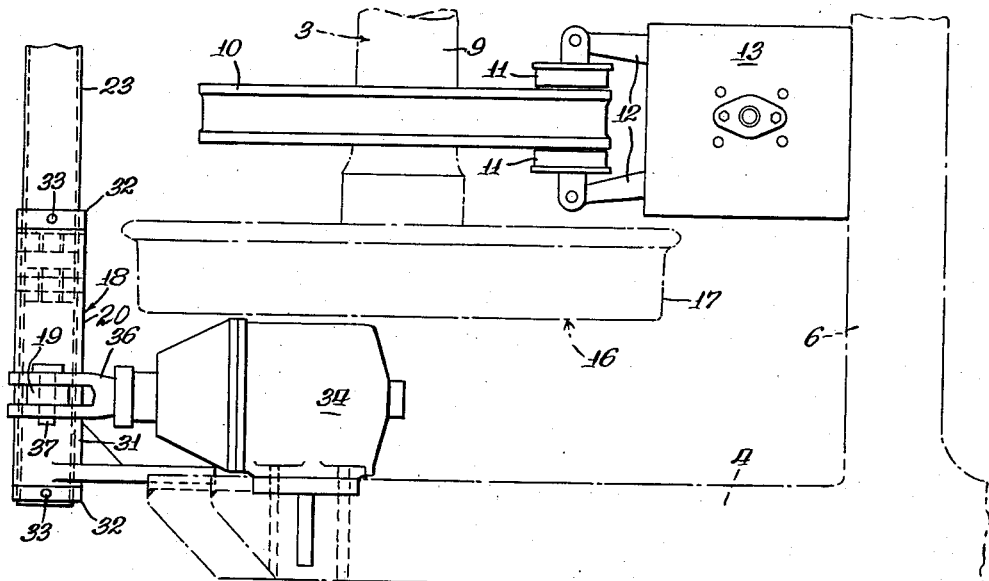
Figure 1 is a fragmentary top plan view illustrating one end of a railway car truck provided with a brake arrangement embodying features of the invention.
Figure 2 is a side elevational view of same.
Figure 3 is an end view of same.

Referring now to the drawings for a better understanding of the invention and more particularly to Figures 1, 2 and 3 thereof, the railway truck structure is shown as comprising a truck frame 2 resiliently supported by any suitable conventional means upon wheel and axle assemblies 3. The truck frame 2 comprises side rails 4—4 interconnected by transoms 6—6, the ends of the side rails being provided with depending spaced pedestals 7—7 to receive conventional journal boxes (not shown) in which the ends of the axles 9—9 are journaled.

The truck is provided with a conventional off-wheel brake arrangement comprising a rotor 10 secured to each axle 9 to be frictionally engaged between brake shoes 11—11 mounted on the ends of levers 12—12, the levers being actuated by a piston cylinder assembly (not shown) provided within a housing 13 mounted on the transom 6.

To coact with the off-wheel brake arrangement in decelerating a railway car, the truck is provided with a wheel brake arrangement in which a single brake shoe 15 is provided to frictionally engage the tread of its respective wheel 16. Frictional engagement of the shoes against the wheel treads also serves to improve the tread surfaces 17 by removing films or coatings of foreign material therefrom to increase the intensity of electrical block signals passing thereto from the rails, and also to increase the coefficient of friction between the tread surfaces and the rails.

Each end of the truck is provided with two single shoe wheel brake arrangements, each being shown as comprising a brake lever structure 18 having an upper arm 19 and a pair of spaced lower arms 21 and 22 provided on and projecting from opposite sides of a bearing sleeve 20 journaled on a fixed shaft 23. A brake head 24 is formed with bearing portions 26—26 straddling the arm 22 and supported thereon for pivotal movement by means of a pivot bolt 27 which extends through aligned apertures in the arms 21 and 22 and said bearing portions. A helical compression spring 28 is mounted on the bolt to frictionally resist pivotal movement of the brake head. The brake shoe 15 is detachably secured on the brake head 24 by a wedge key 29.

The ends of the shaft 23 are journaled in bearing brackets 31—31 welded or otherwise secured to the inboard sides of their respective side rails 4—4 and adjacent pedestals 7. Abutment collars 32—32 are secured on the shaft 23 by means of pins 33 to prevent axial movement of the shaft and brake levers 18 relative to the bearing brackets 31—31.

A pneumatic piston-cylinder assembly 34 is secured to the side rail 4 and provided with a piston rod 36 connected to the upper lever arm 19 by a pin 37. It will be understood that air under pressure is directed through suitable conduits to the brake cylinders 34 and off-wheel brake cylinders to actuate the brake levers 18 and 12, respectively.

Figures 4 and 5 in the drawings illustrate a modified form of the invention in which the piston rod 36 is connected to the outboard end of a dead lever 41 which is pivotally mounted at 42 on the side rail 4. The inboard end of the dead lever 41 is connected to one end of a link 43 which has its other end connected to the upper end of a brake lever arm 19. This form of the invention is otherwise similar to the form heretofore shown and described.

We claim:

1. In a railway car truck, a frame comprising side rails connected intermediate their ends by transoms, wheel and axle assemblies supporting said frame, and a unitary brake arrangement rigidly secured to the ends of the frame, said arrangement comprising bearing brackets secured to adjacent ends of said side rails, a shaft supported adjacent its ends by said brackets, a hub portion rotatably mounted on said shaft adjacent each of the wheels of said assembly, releasable means interlocking said shaft and brackets to prevent relative motion therebetween, opposed vertical arms carried by said hub portion, a brake shoe assembly carried by the lower end of one of said arms, said brake shoe assembly being engageable with the wheel tread friction surface of one of the wheels of said assemblies, the other of said arms being disposed outboardly of said wheel, and a power cylinder secured to the frame outboardly of said wheel, said cylinder being operatively connected to the upper end of said other arm, said brake shoe assembly being the sole means to frictionally engage said wheel tread friction surface.

2. In a railway car truck, a frame comprising side rails interconnected intermediate their ends by transoms, means including wheel and axle assemblies supporting said frame, and a unitary brake arrangement secured to the adjacent ends of the frame, said arrangement comprising brackets secured to the end of the frame, a shaft nonrotatably carried adjacent the ends thereof by said brackets, a hub disposed adjacent each of the wheels of said assemblies and being rotatably carried by the shaft, an arm extending downwardly from said hub and being rigidly secured thereto, a brake shoe assembly carried by the lower end of said arm and being engageable with the periphery of said wheel, a power cylinder secured to the frame outboardly of said wheel, said cylinder comprising a piston and a piston rod, an arm disposed outboardly of said wheel and extending upwardly from said hub, said last-mentioned arm being rigidly secured to said hub and having its upper end pivotally connected to said piston rod, said brake shoe assembly being the sole member frictionally engaging the periphery of the wheel to frictionally retard the latter.

3. In a railway car truck, a frame comprising side rails interconnected intermediate their ends by transoms, means including wheel and axle assemblies supporting said frame, and a unitary brake arrangement secured to the adjacent ends of the frame, said arrangement comprising brackets secured to the ends of the frame, a shaft nonrotatably carried adjacent the ends thereof by said brackets, a hub disposed adjacent each of the wheels of said assemblies and being rotatably carried by the shaft, an arm extending downwardly from said hub and being rigidly secured thereto, a brake shoe assembly carried by the lower end of said arm and being engageable with the periphery of said wheel, a power cylinder secured to the frame outboardly of said wheel, said cylinder comprising a piston and a piston rod, a cylinder lever pivotally carried by the frame intermediate the ends thereof, said lever having its outboard end pivotally connected to said piston rod, a link having one end pivotally connected to the inboard end of said lever, and an arm extending upwardly from said hub, said last-mentioned arm being rigidly secured to said hub outboardly of said wheel and having its upper end pivotally connected to the other end of said link, said brake shoe assembly being the sole member frictionally engaging the periphery of the wheel to frictionally retard the wheel.

References Cited in the file of this patent
UNITED STATES PATENTS

| | | |
|---|---|---|
| 2,110,992 | Holloway | Mar. 15, 1938 |
| 2,149,496 | Baselt | Mar. 7, 1939 |
| 2,221,074 | Burrows et al. | Nov. 12, 1940 |
| 2,272,647 | Simanek | Feb. 10, 1942 |